United States Patent
Zhu (10) Patent No.: US 12,218,307 B2
(45) Date of Patent: Feb. 4, 2025

(54) ELECTROLYTIC SOLUTION, LITHIUM-ION BATTERY, BATTERY MODULE, BATTERY PACK AND APPARATUS

(71) Applicant: CONTEMPORARY AMPEREX TECHNOLOGY (HONG KONG) LIMITED, Hong Kong (CN)

(72) Inventor: Jianwei Zhu, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 1078 days.

(21) Appl. No.: 17/132,583

(22) Filed: Dec. 23, 2020

(65) Prior Publication Data
US 2021/0119257 A1    Apr. 22, 2021

Related U.S. Application Data

(63) Continuation of application No. PCT/CN2019/114197, filed on Oct. 30, 2019.

(30) Foreign Application Priority Data

Oct. 30, 2018   (CN) .................. 201811275598.X (51) Int. Cl.
*H01M 10/0567* (2010.01)
*H01M 4/02* (2006.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
CPC ......... H01M 10/0567; H01M 10/0525; H01M 4/505; H01M 4/525; H01M 2004/028; H01M 2220/20; H01M 2300/0025
See application file for complete search history.

(56) References Cited

U.S. PATENT DOCUMENTS

2006/0177742 A1* 8/2006 Abe .................. H01M 10/0568
                                                          429/330
2009/0130555 A1   5/2009 Ichihashi
                                  (Continued)

FOREIGN PATENT DOCUMENTS

CN        101436686 A     5/2009
CN        103891036 A     6/2014
                                  (Continued)

OTHER PUBLICATIONS

Contemporary Amperex Technology Co., Limited, International Search Report and Written Opinion, PCT/CN2019/114197, Jan. 22, 2020, 12 pgs.
(Continued)

*Primary Examiner* — Sean P Cullen
*Assistant Examiner* — Kimberly Wyluda
(74) *Attorney, Agent, or Firm* — Kilpatrick Townsend & Stockton LLP (57) ABSTRACT

This application relates to the field of batteries, and in particular, to an electrolytic solution and a lithium-ion battery, a battery module, a battery pack and an apparatus
(Continued)

that adopt the electrolytic solution. This application provides an electrolytic solution, including an electrolyte and a solvent, and further including an additive A and an additive B. The additive A is selected from at least one of compounds whose chemical structural formula is denoted by Formula I, and the additive B is selected from at least one of compounds whose chemical structural formula is denoted by Formula II. By using the additive A and the additive B together, this application enables films to be formed on surfaces of a positive electrode plate and a negative electrode plate concurrently, thereby significantly improving cycle performance and high-temperature storage performance of the lithium-ion battery, and also ensuring excellent kinetic performance of the lithium-ion battery.

20 Claims, 3 Drawing Sheets

(51) Int. Cl.
  *H01M 4/505* (2010.01)
  *H01M 4/525* (2010.01)
  *H01M 10/0525* (2010.01)

(52) U.S. Cl.
  CPC .. *H01M 10/0525* (2013.01); *H01M 2004/028* (2013.01); *H01M 2220/20* (2013.01); *H01M 2300/0025* (2013.01)

(56) References Cited

U.S. PATENT DOCUMENTS

| 2014/0234727 A1* | 8/2014 | Abe | H01M 10/0568 |
| | | | 429/330 |
| 2017/0214091 A1* | 7/2017 | Abe | H01G 11/50 |

FOREIGN PATENT DOCUMENTS

| CN | 101789526 B | 9/2014 |
| CN | 104466249 A | 3/2015 |
| CN | 104508896 A | 4/2015 |
| CN | 103891036 B | 1/2016 |
| CN | 105958118 A | 9/2016 |
| CN | 106299462 A | 1/2017 |
| CN | 107706455 A | 2/2018 |
| CN | 108306048 A | 7/2018 |
| CN | 108598574 A | 9/2018 |
| EP | 2884557 A1 | 6/2015 |
| JP | 2011060464 A | 3/2011 |
| JP | 2013178953 A | 9/2013 |
| KR | 20160052382 A | 5/2016 |

OTHER PUBLICATIONS

Contemporary Amperex Technology Co., Limited, Extended European Search Report, EP19880378.5, Aug. 17, 2021, 8 pgs.
Ningder Age New Energy Technology Co., Ltd., First Office Action, CN2018112755598.X, Sep. 27, 2020, 15 pgs.
First Office Action received in the corresponding Chinese Application 202110806493.8, mailed Nov. 9, 2022.

* cited by examiner

ELECTROLYTIC SOLUTION, LITHIUM-ION BATTERY, BATTERY MODULE, BATTERY PACK AND APPARATUS

CROSS REFERENCE TO RELATED APPLICATIONS

This application is a continuation application of PCT Patent Application No. PCT/CN2019/114197, entitled "ELECTROLYTIC SOLUTION, LITHIUM ION BATTERY, BATTERY MODULE, BATTERY PACK AND DEVICE" filed on Oct. 30, 2019, which claims priority to Chinese Patent Application No. 201811275598.X, filed with the State Intellectual Property Office of the People's Republic of China on Oct. 30, 2018, and entitled "ELECTROLYTIC SOLUTION AND LITHIUM-ION BATTERY", all of which are incorporated herein by reference in their entirety.

TECHNICAL FIELD

This application relates to the field of batteries, and in particular, to an electrolytic solution and a lithium-ion battery, a battery module, a battery pack and an apparatus that adopt the electrolytic solution.

BACKGROUND

With increasing depletion of petrochemical energy and deterioration of climate on Earth, the development of new clean energy and the strengthening of energy conservation and emission reduction have become top priorities of all countries in the world. In recent years, the construction of hybrid electric vehicle projects, battery electric vehicle projects, and grid-connected new energy power station projects is speeding up. High-energy-density power batteries have become one of core technologies to be developed vigorously. By virtue of advantages such as high voltage, ultra-high capacity, good cycle performance, and environment friendliness, lithium-ion battery products have been accepted more widely by society.

With the promotion of new energy vehicles, power-type lithium-ion batteries have been developed immensely. In view of high requirements imposed by new energy vehicles on a cruising range, the lithium-ion batteries are also required to have a high energy density, high cycle performance, and high safety performance. During a charging and discharging process of a lithium-ion battery, a negative electrode active material is graphite with a small interplanar spacing, and some negative electrode active materials also include a silicon-based material with a higher volume expansion rate. Therefore, during a cyclic process of the lithium-ion battery, the graphite and the silicon-based material in a negative electrode plate are in an ongoing cyclic process of expansion and contraction in size. Because a binding effect of a binder between particles gradually diminishes or even vanishes, the negative electrode plate expands cyclically and irreversibly and becomes too thick. This not only deteriorates kinetic performance of the battery and leaves the negative electrode active material to be at high risk of detaching, but also continuously damages a solid electrolyte interphase (SEI) film on a surface of the negative electrode plate, and continuously exposes fresh surfaces of the negative electrode active material massively. The exposed negative electrode active material is likely to trigger side reactions with an electrolytic solution and deteriorate the cycle performance and the high-temperature storage performance of the battery. On the other hand, during the charging and discharging process of the lithium-ion battery, the positive electrode active material itself does not change in size significantly. However, the positive electrode material is at a high potential and is highly oxidative. Especially for a ternary material that contains a high nickel content, the positive electrode material is prone to side reactions with the electrolytic solution, thereby also deteriorating the performance such as the high-temperature storage performance of the battery. In view of the urgent need to improve the cycle performance and the high-temperature performance of power batteries during long-term service, a new electrolytic solution that matches a high-capacity battery system needs to be developed in practical applications.

SUMMARY

In view of disadvantages in the prior art described above, an objective of this application is to provide an electrolytic solution and a lithium-ion battery, a battery module, a battery pack and an apparatus that adopt the electrolytic solution to solve problems in the prior art.

To achieve the foregoing objective and other relevant objectives, a first aspect of this application provides an electrolytic solution, including an electrolyte and a solvent, and further including an additive A and an additive B. The additive A is selected from at least one of compounds whose chemical structural formula is denoted by Formula I:

where, $R_1$, $R_2$, $R_3$, and $R_4$ are each independently selected from: H; F; Cl; Br; I; saturated or unsaturated, substituted or unsubstituted $C_1$-$C_{10}$ aliphatic groups; substituted or unsubstituted $C_3$-$C_9$ cycloalkyls; substituted or unsubstituted $C_1$-$C_{10}$ alkoxies; substituted or unsubstituted $C_6$-$C_{20}$ aryls; or, substituted or unsubstituted $C_3$-$C_{20}$ heteroaryls;

a value of $n_1$ is 0, 1, 2, 3, 4, or 5;

a value of $n_2$ is 0, 1, 2, 3, 4, 5, 6, 7, 8, or 9;

the additive B is selected from at least one of compounds whose chemical structural formula is denoted by Formula II:

In Formula II, R is one or more of F, Cl, Br, or I; M is P or B; when M is P, n+2m=6, and m is 1 or 2; when M is B, n+2m=4, and m is 0 or 1.

Another aspect of this application discloses uses of the electrolytic solution in a field of preparing a lithium-ion battery.

A second aspect of this application provides a lithium-ion battery, including a positive electrode plate, a negative electrode plate, a separator, and the electrolytic solution described above, where the separator is located between the positive electrode plate and the negative electrode plate.

A third aspect of this application provides a battery module, including the lithium-ion battery according to the second aspect of this application.

A fourth aspect of this application provides a battery pack, including the battery module according to the third aspect of this application.

A fifth aspect of this application provides an apparatus, including the lithium-ion battery according to the second aspect of this application. The lithium-ion battery is used as a power supply to the apparatus.

In the electrolytic solution provided in this application, the additive A and the additive B are introduced into the electrolytic solution of a lithium-ion battery. By using the additive A and the additive B together, this application enables films to be formed on surfaces of a positive electrode plate and a negative electrode plate concurrently, and enables formation of a highly polymerized, highly ordered, low-resistance tough meshed organic film on the surface of the negative electrode, thereby significantly improving cycle performance and high-temperature storage performance of the lithium-ion battery, and also ensuring excellent kinetic performance of the lithium-ion battery. In addition, a positive electrode film-forming additive C is used together in the electrolytic solution, so as to optimize components of a solid electrolyte interphase (SEI) film on a positive electrode interface, ensure a relatively high capacity retention rate of the lithium battery during cycles, and further improve the high-temperature storage performance of the battery.

The battery module, the battery pack, and the apparatus provided in this application include the lithium-ion battery, and therefore, have at least the same advantages as the lithium-ion battery.

REFERENCE NUMERALS ARE AS FOLLOWS

1: Battery pack;
2: Upper container part;
3: Lower container part;
4: Battery module;
5: Battery;
51: Casing;
52: Electrode assembly;
53: Top cover assembly.

DESCRIPTION OF EMBODIMENTS

The following describes in detail an electrolytic solution, a lithium-ion battery, a battery module, a battery pack, and an apparatus according to this application.

A first aspect of this application provides an electrolytic solution, including an electrolyte and a solvent, and further including an additive A and an additive B. The additive A is selected from at least one of compounds whose chemical structural formula is denoted by Formula I:

where, $R_1$, $R_2$, $R_3$, and $R_4$ are each independently selected from: H; F; Cl; Br; I; saturated or unsaturated, substituted or unsubstituted $C_1$-$C_{10}$, $C_1$-$C_6$, or $C_1$-$C_3$ aliphatic groups; substituted or unsubstituted $C_3$-$C_9$ or $C_3$-$C_6$ cycloalkyls; substituted or unsubstituted $C_1$-$C_{10}$, $C_1$-$C_6$, or $C_1$-$C_3$ alkoxies; substituted or unsubstituted $C_6$-$C_{20}$ or $C_6$-$C_{12}$ aryls; or, substituted or unsubstituted $C_3$-$C_{20}$ or $C_3$-$C_{12}$ heteroaryls;

a value of $n_1$ is 0, 1, 2, 3, 4, or 5;
a value of $n_2$ is 0, 1, 2, 3, 4, 5, 6, 7, 8, or 9;
the additive B is selected from at least one of compounds whose chemical structural formula is denoted by Formula II:

In Formula II, $R_5$ is one or more of F, Cl, Br, or I; M is P or B; when M is P, n+2m=6, and m is 1 or 2; when M is B, n+2m=4, and m is 0 or 1.

In this application, the aliphatic groups generally mean chain hydrocarbon compounds such as an alkyl, an alkenyl, and an alkynyl. The aliphatic groups may be, but without limitation, methyl, ethyl, vinyl, ethynyl, propyl, propenyl, propinyl, butyl, butenyl, butynyl, pentyl, hexyl, heptyl, octyl, nonyl, and decyl. The aliphatic groups may be monosubstituted or polysubstituted. Substituents of the aliphatic groups include, but without limitation, halogen atoms such as F, Cl, and Br. The substituted aliphatic groups may be specifically, but without limitation, fluoroethylene, fluoropropyl, or chlorobutyl.

In this application, the cycloalkyl is meant to be a saturated or unsaturated (but not aromatic) cyclic hydrocarbon, including but not limited to cyclopropyl, cyclobutyl, cyclopentyl, cyclohexyl, or cycloheptyl. The cycloalkyls further include a saturated cycloalkyl, in which, optionally, at least one carbon atom may be replaced by a heteroatom. Exemplarily, the heteroatom may be S, N, P, or O. In addition, monounsaturated or polyunsaturated (exemplarily, monounsaturated) cycloalkyls whose ring contains no heteroatom are also cycloalkyls unless they are in an aromatic system. The cycloalkyls may be monosubstituted or polysubstituted. Substituents of the cycloalkyls include, but without limitation, halogen atoms such as F, Cl, and Br. The substituted cycloalkyls may be specifically, but without limitation, 2-fluorocyclopentyl or 3-fluorocyclohexyl.

In this application, the alkoxies include, but without limitation, methoxy, ethoxy, and propoxy. The alkoxies may be monosubstituted or polysubstituted. Substituents of the alkoxies include, but without limitation, halogen atoms such as F, Cl, and Br. The substituted alkoxies may be, but without limitation, fluoropropoxy or trifluoroethoxy.

In this application, an aryl generally means a closed ring system with at least one aromatic ring, and generally includes no heteroatom (for example, N, or O). The aryl includes, but without limitation, phenyl, naphthyl, fluoranthenyl, fluorenyl, tetrahydro-naphthyl, indanyl, or anthracenyl. The aryls may be monosubstituted or polysubstituted. Substituents of the aryls include, but without limitation, halogen atoms such as F, Cl, and Br. The substituted aryls may be specifically, but without limitation, monofluorophenyl, fluoro-ethylnaphthyl, or tetrafluoro-substituted naphthyl.

In this application, a heteroaryl means a heterocyclic system, includes at least one aromatic ring, and optionally includes one or more heteroatoms selected from N, O, S, or the like. The heterocyclic aryl includes, but without limitation, furyl, thienyl, and the like. The heterocyclic aryl may be monosubstituted or polysubstituted. Substituents of a heteroaromatic ring include, but without limitation, halogen atoms such as F, Cl, and Br. The substituted heteroaryl may be specifically be, but without limitation, fluoromethylfuran or trifluoroethylthiophene.

In the electrolytic solution provided in this application, generally the additive A may be a cyclic acid anhydride compound containing an unsaturated bond, include a unique bifunctional structure of olefin and acid anhydride, and trigger ring opening polymerization through free radicals in a charging and discharging process of the lithium-ion battery to form highly ordered, high-molecular-weight long-chain compounds. The high-molecular-weight long-chain compounds effectively collide with one another, and re-trigger, through the free radicals, two bonds in a side chain structure to polymerize for a second time to form a highly polymerized, highly ordered, tough meshed organic film. The meshed organic film covers the surface of the negative electrode to effectively reduce active positions on the surface of the negative electrode, prevent an electrolytic solvent from reductive decomposition on the surface of the negative electrode, and reduce occurrence of poor resistance of the battery in the charging/discharging process of the lithium battery. However, when the electrolytic solution includes only the additive A component, due to a high resistance of components of the SEI film, an initial direct-current resistance of the battery is relatively high, and the battery incurs a problem of abrupt deterioration of high-temperature storage performance. The additive B is a lithium phosphate salt or a lithium borate salt containing oxalate, and can form a film on the positive electrode and the negative electrode concurrently. This significantly improves interface compatibility between the negative electrode and the electrolytic solution, ensures a low internal resistance of a battery cell, and improves the high-temperature storage performance of the battery cell. In the electrolytic solution provided in this application, a conductivity of the electrolytic solution may be 7.2 mS/cm-8.5 mS/cm, 7.2 mS/cm-7.3 mS/cm, 7.3 mS/cm-7.4 mS/cm, 7.4 mS/cm-7.5 mS/cm, 7.5 mS/cm-7.6 mS/cm, 7.6 mS/cm-7.7 mS/cm, 7.7 mS/cm-7.8 mS/cm, 7.8 mS/cm-7.9 mS/cm, 7.9 mS/cm-8.0 mS/cm, 8.0 mS/cm-8.1 mS/cm, 8.1 mS/cm-8.2 mS/cm, 8.2 mS/cm-8.3 mS/cm, 8.3 mS/cm-8.4 mS/cm, or 8.4 mS/cm-8.5 mS/cm. With a synergistic effect of the additive A and the additive B, a more effective interaction effect is achieved under a suitable conductivity range. When the conductivity in the electrolytic solution is in a range of 7.2 mS/cm-8.5 mS/cm, an electrochemical reaction speed on interfaces of the positive and negative electrodes in the lithium battery is moderate. Therefore, the additive B can fully decompose to form a film during battery formation. After the additive A that is easily reduced into a film is added, the formed SEI film is very tough, the resistance on the negative electrode interface is significantly reduced, and kinetic cycle performance of the battery cell is excellent.

In the electrolytic solution provided in this application, $R_1$ and $R_2$ in the compound denoted by Formula I each may be independently selected from hydrogen or phenyl. and the value of $n_1$ may be 0 or 1. Specifically, the additive A may be selected from one or more of compounds whose chemical structural formula is denoted by Formula I-A, Formula I-B, Formula I-C, and Formula I-D:

I-A

I-B

I-C

I-D where, $R_3$ and $R_4$ are each independently selected from: H; F; Cl; Br; I; saturated or unsaturated, substituted or unsubstituted C1-C10, C1-C6, or C1-C3 aliphatic groups; substituted or unsubstituted C3-C9 or C3-C6 cycloalkyls; substituted or unsubstituted C1-C10, C1-C6, or C1-C3 alkoxies; substituted or unsubstituted C6-C20 or C6-C12 aryls; or, substituted or unsubstituted C3-C20 or C3-C12 heteroaryls; and the value of $n_2$ is 0, 1, 2, 3, 4, 5, 6, 7, 8, or 9.

In the electrolytic solution provided in this application, the value of $n_2$ in the compound denoted by Formula I may be 0, 1, 2, 3, 4, 5, 6, 7, 8, or 9. $R_3$ may be selected from hydrogen (H), a halogen atom, or an alkyl substituted with a halogen atom. Each halogen atom may be independently selected from F or Br. $R_4$ may be selected from H. More specifically, the additive A may be selected from one or more of compounds denoted by:

In the electrolytic solution provided in this application, meshed toughened film formed by the additive A helps to improve the cycle performance and high-temperature storage features of the lithium-ion battery, and mitigate gas generation of the lithium-ion battery under a high temperature. With a high content of the additive A in the electrolytic solution, the formed SEI film is too thick, gives rise to a relatively high initial resistance, and severely affects kinetic performance such as power output of the lithium-ion battery. Conversely, if the content is too low, no effective SEI film is formed on a surface of a negative electrode material, thereby reducing the resistance during the charge and discharge cycles, and incurring more side reactions. A person skilled in the art may select a suitable amount of the additive A. For example, the mass of the additive A is 0.01%-10%, 0.01%-6%, 0.01%-0.05%, 0.05%-0.1%, 0.1%-0.3%, 0.3%-0.5%, 0.5%-1%, 1%-2%, 2%-3%, 3%-4%, 4%-5%, 5%-6%, 6%-7%, 7%-8%, 8%-9%, or 9%-10% of the total mass of the electrolytic solution.

In the electrolytic solution provided in this application, the additive B is selected from at least one of oxalate-containing lithium phosphate salts denoted by Formula II-A or II-B:

where, A, B, C, D, J, and K are each independently selected from F, Cl, Br or I.

In the electrolytic solution provided in this application, a person skilled in the art may select a suitable amount of the additive B. For example, the mass of the additive B is 0.01%-10%, 0.01%-5%, 0.01%-0.05%, 0.05%-0.1%, 0.1%-0.3%, 0.3%-0.5%, 0.5%-1%, 1%-2%, 2%-3%, 3%-4%, 4%-5%, 5%-6%, 6%-7%, 7%-8%, 8%-9%, or 9%-10% of the total mass of the electrolytic solution. As an additive for reducing an initial resistance in forming a film, the additive B can decompose on the surface of the negative electrode plate and participate in the formation of the SEI, thereby effectively mitigating the problem of a high interface resistance of the SEI film formed by only the decomposition of the additive A, and forming a highly polymerized, highly ordered, low-resistance tough meshed organic SEI film.

In the electrolytic solution provided in this application, a mass ratio of the additive A to the additive B may be 1:0.1-10, 1:0.1-0.2, 1:0.2-0.3, 1:0.3-0.4, 1:0.4-0.5, 1:0.5-0.6, 1:0.6-0.7, 1:0.7-0.8, 1:0.8-0.9, 1:0.9-1, 1:1-1.1, 1:1.1-1.3, 1:1.3-1.5, 1:1.5-2, 1:2-3, 1:3-4, 1:4-5, 1:5-6, 1:6-7, 1:7-8, 1:8-9, or 1:9-10. A relative content of the additive A in relation to the additive B in the electrolytic solution affects film formation quality and interface resistance of the SEI film on the surfaces of the positive and negative electrodes. If the relative content of the additive A is too high, the content of the additive B is too law in decomposing into a film at the negative electrode interface. Consequently, the initial resistance of the film formed on the negative electrode is still high, and the kinetic performance is deteriorated. If the relative content of the additive A is too low, a highly polymerized, highly ordered, rough meshed organic film cannot be formed on the surface of the negative electrode, many side effects such as severe gas generation under a high temperature occur, and the cycle performance and the high-temperature performance are not improved significantly.

The electrolytic solution provided in this application may further include an additive C. The additive C is selected from at least one of a cyclic sulfite compound containing an S=O group or a cyclic sulfate compound containing an S=O group. The additive C introduced into the electrolytic solution can optimize components of the SEI film on the positive electrode interface, ensure a relatively high capacity retention rate of the lithium battery during cycles, and further improve the storage performance of the battery.

In the electrolytic solution provided in this application, the chemical structural formula of the S=O containing bonded compound is denoted by Formula III:

where, $R_6$ and $R_7$ are each independently selected from: H; F; Cl; Br; I; saturated or unsaturated, substituted or unsubstituted $C_1$-$C_{10}$, $C_1$-$C_6$, or $C_1$-$C_3$ aliphatic groups; substituted or unsubstituted $C_3$-$C_9$ or $C_3$-$C_6$ cycloalkyls; substituted or unsubstituted $C_1$-$C_{10}$, $C_1$-$C_6$, or $C_1$-$C_3$ alkoxies; substituted or unsubstituted $C_6$-$C_{20}$ or $C_6$-$C_{12}$ aryls; or, substituted or unsubstituted $C_3$-$C_{20}$ or $C_3$-$C_{12}$ heteroaryls. In a desired implementation of this application, $R_6$ and $R_7$ are each independently selected from hydrogen.

In the electrolytic solution provided in this application, the mass of the additive C is 0.1%-8% of the total mass of the electrolytic solution. In the electrolytic solution provided in this application, the additive C can form a film on the positive electrode, thereby helping to improve the storage performance of the lithium battery. A too high content of the additive C cannot significantly improve the high-temperature storage performance of the lithium battery, and a too low content cannot effectively adjust the components of the SEI film on the positive electrode interface, and many defects such as poor high-temperature storage performance of the battery exist. Exemplarily, the mass of the additive C is 0.1%-5%, 0.1%-0.3%, 0.3%-0.5%, 0.5%-0.7%, 0.7%-1%, 1%-2%, 2%-3%, 3%-4%, or 4%-5% of the total mass of the electrolytic solution.

In the electrolytic solution provided in this application, a person skilled in the art may choose an electrolyte suitable for the foregoing additives. Generally, the electrolyte may be an electrolyte applicable to a lithium-ion battery. For example, the electrolyte may be, but without limitation, one or more of a complex salt of a Lewis acid and LiF, an imine, or a methylated lithium salt, a lithium salt containing an $S(=O)_2O$ structure, a lithium salt containing a $P=O$ or $Cl=O$ structure, or a lithium salt that uses an oxalate ligand as an anion. For another example, the complex salt of the Lewis acid and LiF may be, but without limitation, one or more of $LiPF_6$, $LiBF_4$, $LiAsF_6$, $LiSbF_6$, $LiPF_4(CF_3)_2$, $LiPF_3(C_2F_5)_3$, $LiPF_3(CF_3)_3$, $LiPF_3(iso-C_3F_7)_3$, or $LiPF(iso-C_3F_7)$, exemplarily may be $LiPF_6$, $LiBF_4$, $LiAsF_6$, or the like, and desirably may be $LiPF_6$, $LiBF_4$ or the like. For another example, the imine or methylated lithium salt may be, but without limitation, one or more of $LiN(SO_2F)_2$, $LiN(SO_2RF)_2$, $LiN(SO_2F)(SO_2RF)$ (where RF is $C_{n'}F_{2n'+1}$, and n' is 1, 2, 3, 4, 5, 6, 7, 8, 9, or 10), $(CF_2)_2(SO_2)_2NLi$(cyclic), $(CF_2)_3(SO_2)_2NLi$(cyclic), or $LiC(SO_2CF_3)_3$, exemplarily may be $LiN(SO_2F)_2$, $LiN(SO_2CF_3)_2$, or $LiN(SO_2C_2F_5)_2$, and desirably may be $LiN(SO_2F)_2$ or $LiN(SO_2CF_3)_2$. For another example, the lithium salt containing an $S(=O)_2O$ structure may be, but without limitation, one or more of $LiSO_3F$, $LiCF_3SO_3$, $CH_3SO_4Li$, $C_2HSO_4Li$, $C_3H_7SO_4Li$, lithium trifluoro((methylsulfonyl)oxy) borate (LiTFMSB), or lithium pentafluoro((methylsulfonyl)oxy)phosphate (LiPFMSP), and exemplarily may be $LiSO_3F$, $CH_3SO_4Li$, $C_2HSO_4Li$, LiTFMSB, or the like. For another example, the lithium salt containing a $P=O$ or $Cl=O$ structure may be, but without limitation, one or more of $LiPO_2F_2$, $Li_2PO_3F$, or $LiClO_4$, and exemplarily, may be $LiPO_2F_2$, $Li_2PO_3F$, or the like. For another example, the lithium salt that uses an oxalate ligand as an anion may be, but without limitation, one or more of bis[oxalate-O,O']lithium borate (LiBOB), difluoro[oxalate-O,O']lithium borate, difluorobis[oxalate-O,O']lithium phosphate (LiPFO), and tetrafluoro[oxalate-O,O']lithium phosphate, and exemplarily may be LiBOB, LiPFO, or the like. In some exemplary implementations of this application, the electrolyte may be, but without limitation, $LiPF_6$, $LiBF_4$, $LiSO_3F$, lithium trifluoro((methylsulfonyl)oxy) borate (LiTFMSB), $LiPO_2F_2$, $LiN(SO_2CF_3)_2$, $LiN(SO_2F)_2$, bis[oxalate-O,O'] lithium borate (LiBOB), and difluorobis[oxalate-O,O'] lithium phosphate (LiPFO), and exemplarily may be $LiPF_6$.

In the electrolytic solution provided in this application, a person skilled in the art may choose a solvent suitable for the foregoing additives. The solvent of the electrolytic solution is generally a nonaqueous solvent, exemplarily an organic solvent, and specifically may be, but without limitation, one or more of ethylene carbonate, propylene carbonate, butene carbonate, pentene carbonate, dimethyl carbonate, diethyl carbonate, dipropyl carbonate, ethyl methyl carbonate, or a halogenated derivative thereof.

A second aspect of this application provides a method for preparing the electrolytic solution according to the first aspect of this application. A person skilled in the art may choose a suitable method to prepare the electrolyte by using the foregoing electrolyte, solution, and additives. For example, the preparation method may include: dissolving an electrolyte and an additive in a solvent, exemplarily under anhydrous conditions.

A third aspect of this application enables use of the electrolytic solution according to the first embodiment of this application in the field of preparing a lithium-ion battery. The electrolytic solution provided in this application may be applied to a lithium-ion battery to serve as an electrolytic solution of the lithium-ion battery, so as to mitigate gas generation problems of the lithium-ion battery during storage and also to ensure a relatively high capacity retention rate of the lithium battery during cycles and improve the high-temperature storage performance of the lithium-ion battery.

Figure 1:
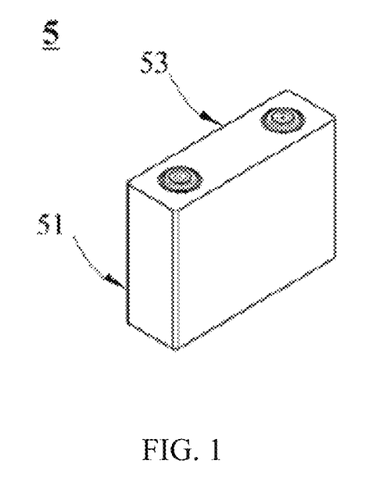
FIG. 1 is a three-dimensional view of an implementation of a battery according to this application.
Figure 2:
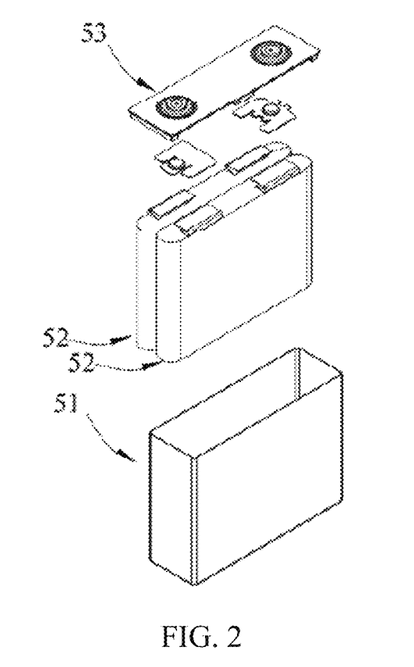
FIG. 2 is an exploded view of FIG. 1.

A fourth aspect of this application provides a lithium-ion battery, including a positive electrode plate, a negative electrode plate, a separator, and the electrolytic solution provided in the first aspect of this application. The separator is located between the positive electrode plate and the negative electrode plate. FIG. 1 is a three-dimensional view of an implementation of a lithium-ion battery 5. FIG. 2 is an exploded view of FIG. 1. Referring to FIG. 1 and FIG. 2, the lithium-ion battery 5 includes a casing 51, an electrode assembly 52, a top cover assembly 53, and an electrolytic solution (not shown). The electrode assembly 52 generally includes a positive electrode plate, a negative electrode plate, and a separator. The separator is generally located between the positive electrode plate and the negative electrode plate. The positive electrode plate, the separator, and the negative electrode plate may be layered so as to be suitable for cutting into a target size and to be stacked in sequence, and may also be wound into a target size to form the electrode assembly 52. In the lithium-ion battery 5, the quantity of electrode assemblies 52 is not limited, and may be one or more. It needs to be noted that the battery shown in FIG. 1 is, but without limitation, a can-shaped battery. The lithium-ion battery 5 may also be a pouch-shaped battery. That is, the casing 51 is replaced with a metal laminated film, and the top cover assembly 53 is canceled.

A person skilled in the art understands the method for preparing a lithium-ion battery using a positive electrode plate, a negative electrode plate, and separator. For example, the method may be the method described in an embodiment of this application.

In the lithium-ion battery provided in this application, the negative electrode plate generally includes a negative electrode current collector and a negative electrode active substance. The negative electrode plate applicable to the lithium-ion battery is known to a person skilled in the art. For example, the negative electrode current collector may be, but without limitation, a metal foil (such as a copper foil). For another example, the negative electrode active substance may be, but without limitation, one or more of natural graphite, artificial graphite, soft carbon, hard carbon, mesocarbon microbead, nanocarbon, simple-substance silicon, a silicon-oxygen compound, a silicon-carbon composite, a silicon alloy, a lithium metal, elemental tin, a tin-oxygen compound, a tin-carbon composite, a tin alloy, or a lithium titanate oxide. In an exemplary implementation of this application, the negative electrode active substance exemplarily includes SiOx, where x is 0.9-1.8, 0.9-1.0, 1.0-1.2, 1.2-1.4, 1.4-1.6, or 1.6-1.8. Desirably, the negative electrode active substance includes a silicon-carbon composite containing SiOx and the like. In the lithium-ion battery, with respect to the 1 gram of SiOx material, the mass of the compound denoted by Formula I is 0.0005 g-0.01 g, 0.0006 g-0.009 g, 0.0007 g-0.008 g, 0.0008 g-0.007 g, 0.0009 g-0.006 g, 0.001 g-0.005 g, 0.0015 g-0.005 g, 0.002 g-0.005 g, 0.0025 g-0.005 g, 0.003 g-0.005 g, 0.0035 g-0.005 g, or 0.004 g-0.005 g. The electrolytic solution provided in this application is particularly suitable for a chemical system in which the negative electrode active substance contains SiOx. Because the SiOx-containing negative electrode active substance exhibits a relatively high volume expansion rate during cycles, an SEI film formed by a conventional film-forming additive on the surface of the negative electrode is not tough. During subsequent charge and discharge cycles, the SEI film formed on the surface of a silicon negative electrode undergoes repeated processes of "formation-rupture-re-formation on a fresh surface". The SEI film keeps thickening, thereby drastically consuming lithium ions in the electrolytic solution and drastically deteriorating the cycle performance of the battery. Through meticulous research, the applicant hereof finds that, when the mass of the additive A in the electrolytic solution is 0.0005 g-0.01 g with respect to 1 gram of SiOx material, an appropriate amount of the additive A can form a low-resistance toughened meshed film on the surface of the SiOx material, thereby helping to improve the film quality of the silicon-containing negative electrode and also ensuring high ion conductivity of the battery. When the content of the additive A in the electrolytic solution is more than 0.01 g with respect to 1 gram of SiOx material, the formed SEI film is too thick, gives rise to a relatively high initial resistance, and severely deteriorates kinetic performance such as power output of the lithium-ion battery. Conversely, if the content is too low, no effective SEI film is formed on the surface of the SiOx material, thereby reducing the resistance during the charge and discharge cycles and incurring more side reactions.

In the lithium-ion battery provided in this application, the thickness of the active substance layer on a single side of the negative electrode plate may be 30 μm-85 μm, 30 μm-35 μm, 35 μm-40 μm, 40 μm-45 μm, 45 μm-50 μm, 50 μm-55 μm, 55 μm-60 μm, 60 μm-65 μm, 65 μm-70 μm, 70 μm-75 μm, 75 μm-80 μm, or 80 μm-85 μm. The negative electrode includes the SiOx material of a high volume expansion rate. Therefore, when the thickness of the electrode plate is in the above range, a transmission distance of lithium ions in the electrode plate is shortened, and the kinetic performance of the battery is further optimized.

In the lithium-ion battery provided in this application, the positive electrode plate generally includes a positive electrode current collector and a positive electrode active substance. The positive electrode plate applicable to the lithium-ion battery is known to a person skilled in the art. For example, the positive electrode current collector may be, without limitation, a metal foil (such as an aluminum foil). For another example, the positive electrode active substance may be, but without limitation, one or more of a lithium cobalt oxide, a lithium nickel oxide, a lithium manganese oxide, a lithium nickel manganese oxide, a lithium nickel cobalt manganese oxide, a lithium nickel cobalt aluminum oxide, or a compound obtained by adding another transition metal or non-transition metal into such lithium transition metal oxides. More specifically, the positive electrode active substance may be, but without limitation, one or more of a layered lithium-containing oxide, a spinel-type lithium-containing oxide, an olivine-type lithium-containing phosphate compound.

In an exemplary implementation of this application, the positive active substance includes a high-nickel ternary positive active substance, and specifically, includes at least one of compounds denoted by Formula IV:

$$Li_{1+y}Ni_aCo_bMe_{1-a-b}O_{2-z}A_z \qquad \text{IV}$$

where, $-0.1 \le y \le 0.2$, $0.5 < a < 0.9$, $0 < b < 0.5$, $0.5 < a+b < 1$, $0 \le z < 0.2$, Me includes one or more of Mn, Fe, Cr, Ti, Zn, V, Al, Zr, or Ce, and A includes one or more of S, N, F, Cl, Br, or I.

In the lithium-ion battery provided in this application, the separator may any of various separators applicable to the lithium-ion batteries in the art, and specifically may be, but without limitation, one or more of polyethylene, polypropylene, polyvinylidene fluoride, or a multilayer composite film thereof.

The electrolytic solution provided in this application may be applied to a lithium-ion battery, so as to mitigate gas generation problems of the lithium-ion battery during storage and also to ensure a relatively high capacity retention rate of the lithium battery during cycles and improve the high-temperature storage performance of the lithium-ion battery. The additive A may be used as a gas generation inhibitor, and the additive B may be used as an additive for reducing the initial resistance during film formation. The advantages of the two additives are complementary to each other. The additive C may be used as a positive electrode film-forming additive and is suitable for use in the electrolytic solution. With the prepared lithium-ion battery, the gas generation problem of the lithium-ion battery during high-temperature storage is mitigated significantly without impairing the cycle performance.

A fifth aspect of this application provides a battery module, including the lithium-ion battery according to the fourth aspect of this application.

Figure 3:
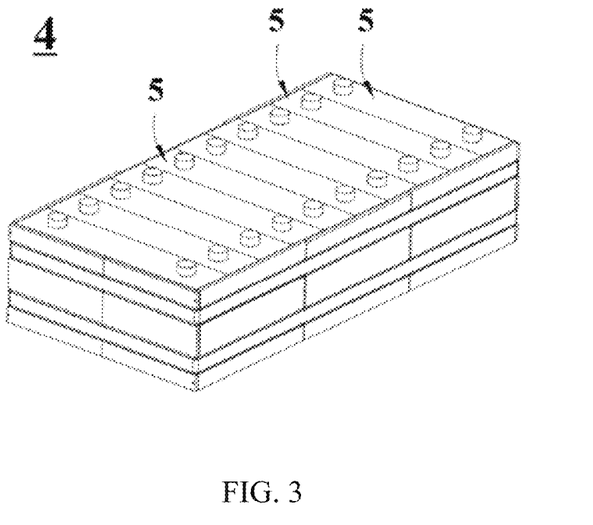
FIG. 3 is a three-dimensional view of an implementation of a battery module.

Further, the quantity of lithium-ion batteries included in the battery module may be adjusted according to the application and capacity of the battery module. FIG. 3 is a three-dimensional view of an implementation of the battery module 4. Referring to FIG. 3, the battery module 4 includes a plurality of lithium-ion batteries 5. The plurality of batteries 5 are arranged in a longitudinal direction.

Figure 4:
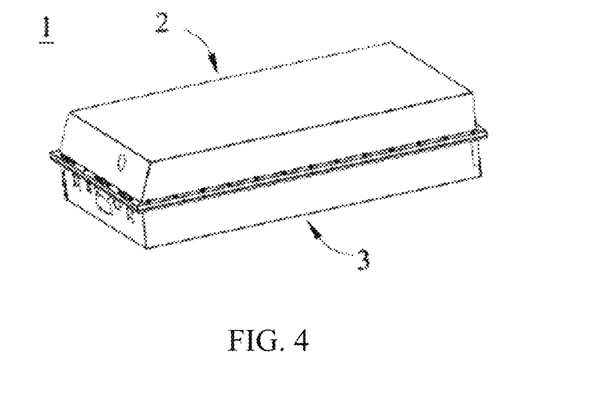
FIG. 4 is a three-dimensional view of an implementation of a battery pack.
Figure 5:
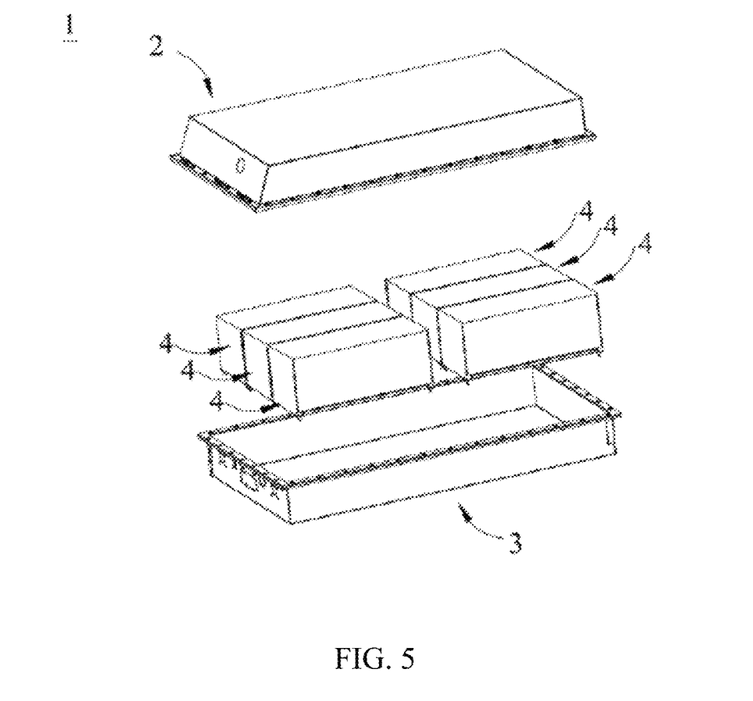
FIG. 5 is an exploded view of FIG. 4.

A sixth aspect of this application provides a battery pack, including the lithium-ion battery according to the fourth aspect of this application or the battery module according to the fifth aspect of this application. FIG. 4 is a three-dimensional view of an implementation of a battery pack 1. FIG. 5 is an exploded view of FIG. 4. Referring to FIG. 4 and FIG. 5, the battery pack 1 includes an upper container part 2, a lower container part 3, and a battery module 4. The upper container part 2 and the lower container part 3 are assembled together to form a space for accommodating the battery module 4. The battery module 4 is fitted into a space formed by assembling the upper container part 2 and the lower container part 3 together. An output electrode of the battery module 4 is led out from either the upper container part 2 or the lower container part 3 or from between the upper container part 2 and the lower container part 3 so as to supply power to the outside or to be charged from the outside. The quantity and arrangement of battery modules 4 may be determined according to actual needs.

According to a seventh aspect of this application, this application provides an apparatus, including the lithium-ion battery according to the fourth aspect of this application, or the battery module according to the fifth aspect, or the battery pack according to the sixth aspect. The lithium-ion battery may be used as a power supply to the apparatus.

Figure 6:
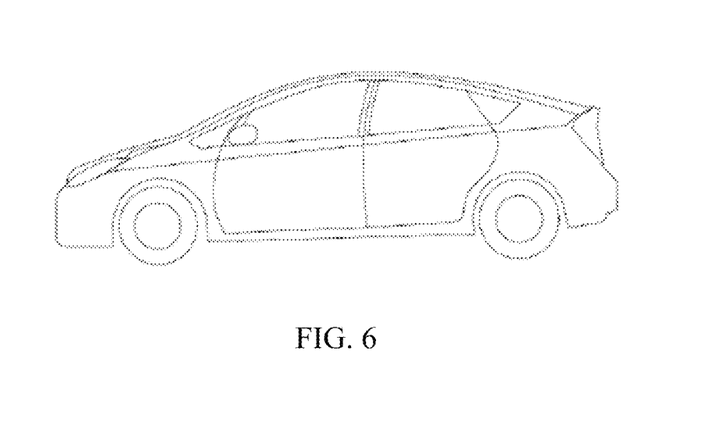
FIG. 6 is a schematic diagram of an implementation of an apparatus whose power supply is a lithium-ion battery.

In exemplary implementations of this application, the apparatus includes a pure electric vehicle, a hybrid electric vehicle, a plug-in hybrid electric vehicle, an electric bicycle, an electric scooter, an electric golf cart, an electric truck, and an energy storage system. FIG. 6 is a schematic diagram of an implementation of an apparatus using a lithium-ion battery as a power supply.

The battery module, the battery pack, and the apparatus include the lithium-ion battery provided in this application, and therefore, have at least the same advantages as the lithium-ion battery, details of which are omitted here.

The following describes the implementation of this application with reference to specific embodiments. A person skilled in the art can easily learn about other advantages and effects of this application from the content disclosed in this specification. This application may also be implemented or applied in other different manners. From a perspective of different viewpoints and applications, details in this specification may be modified or changed without departing from the spirit of this application.

It needs to be noted that unless otherwise explicitly specified herein, process equipment or apparatuses mentioned in the following embodiments are conventional equipment or apparatuses in the art.

In addition, understandably, unless otherwise specified herein, a combination of one or more method steps mentioned in this application shall not preclude other method steps existent before or after the combination of steps, or preclude other method steps from being inserted between the explicitly mentioned steps. Further, understandably, unless otherwise specified herein, a combination or connection relationship between one or more devices/apparatuses mentioned herein shall not preclude other devices/apparatuses existent before or after the combined devices/apparatuses, or preclude other devices/apparatuses from being inserted between two devices/apparatuses explicitly mentioned herein. Moreover, unless otherwise specified, reference numerals of the method steps are intended only for ease of identification rather than for limiting the arrangement order of the method steps or for limiting the scope of applicability of this application. Any change or adjustment to the relative relationship between the reference numerals shall fall within the scope of applicability of this application to the extent that no substantive change is made to the technical content hereof.

Embodiment 1

A lithium-ion battery (battery for short) Si is prepared according to the following method:
(1) Preparing a Positive Electrode Plate Mixing lithium nickel cobalt manganese oxide ($LiNi_{0.8}Co_{0.1}Mn_{0.1}O_2$), a binder (polyvinylidene fluoride), and a conductive agent (conductive carbon black) at a mass ratio of 98:1:1, and adding the mixture into an N-methylpyrrolidone (NMP) solvent system; stirring the mixture with a vacuum mixer until the system becomes homogeneous and transparent, so that a positive electrode slurry is obtained; coating a 12 μm-thick aluminum foil with the positive electrode slurry homogeneously; drying the aluminum foil in the air under a room temperature, and relocating the aluminum foil into a 120° C. oven for drying for 1 hour, and then performing cold calendering and slitting to obtain a positive electrode plate.

(2) Preparing a Negative Electrode Plate

Mixing artificial graphite, a conductive agent (conductive carbon black), and a binder (polyacrylate) at a mass ratio of 98:1:1, and adding the mixture into deionized water; stirring the mixture with a vacuum mixer to obtain a negative electrode slurry; coating an aluminum foil with the negative electrode slurry homogeneously; drying the aluminum foil in the air under a room temperature, and relocating the aluminum foil into a 120° C. oven for drying for 1 hour, and then performing cold calendering and slitting to obtain a negative electrode plate.

(3) Preparing an Electrolytic Solution

Mixing rectified, dehydrated and purified ethylene carbonate (EC) and diethyl carbonate (DEC) homogeneously in a drying room to form an organic solvent; dissolving a fully dried lithium salt $LiPF_6$ in the organic solvent, and then adding an additive into the organic solvent, and mixing them homogeneously to obtain an electrolytic solution. The concentration of the lithium salt is 1 mol/L, the content of the lithium salt is 12.5% of the total mass of the electrolytic solution, and the mass ratio of the EC to the DEC is EC:DEC=1:1. Specific types and content of the additive is shown in Table 1.

(4) Preparing a Lithium-Ion Battery

Sequentially stacking a conventionally slit 0.278 mm-thick positive electrode plate, a 0.109 mm-thick negative electrode plate, and a 0.016 mm-thick high-strength thin-film polyolefin porous film that has undergone ceramic treatment, so that a separator is located between the positive electrode plate and the negative electrode plate for a separation purpose; winding the stacked materials to obtain a bare battery cell; leaving the bare cell of a 2.6 Ah capacity in an outer packaging foil; injecting 10.8 grams of the prepared electrolytic solution into a dried cell; and performing steps such as vacuum packaging, standing, formation, and reshaping to obtain a lithium-ion battery (Si for short).

The preparation method in Embodiments 2-33 (the batteries in the embodiments are numbered S2-S33) and in the Comparative Embodiments 1-12 (the batteries in the comparative embodiments are numbered D1-D12) is almost the same as that in Embodiment 1 except a difference in a formula of the electrolytic solution. Types and dosages of additives in the electrolytic solution in Comparative Embodiments 1-12 and Embodiments 1-33 are shown in Table 1.

TABLE 1

| Battery number | Negative active substance, SiO$_X$ mass percent | Mass of the additive A with respect to 1 gram of SiO$_X$ (g) | Additive A Mol. 1 | Additive A Mol. 2 | Additive A Mol. 3 | Additive A Mol. 4 | Additive B LiDFOP | Additive B LiTFOP | Additive C DTD |
|---|---|---|---|---|---|---|---|---|---|
| D1 | Artificial graphite, 0% | — | 0.5 | — | — | — | — | — | — |
| D2 | Artificial graphite, 0% | — | — | 0.5 | — | — | — | — | — |
| D3 | Artificial graphite, 0% | — | — | — | 0.5 | — | — | — | — |
| D4 | Artificial graphite, 0% | — | — | — | — | — | — | — | — |
| D5 | Artificial graphite, 0% | — | — | — | — | — | 0.5 | — | — |
| D6 | Artificial graphite, 0% | — | — | — | — | — | — | 0.5 | — |
| D7 | Artificial graphite, 0% | — | — | — | — | — | — | — | 0.5 |
| D8 | Artificial graphite, 0% | — | 0.5 | — | — | — | — | — | 0.5 |
| D9 | Artificial graphite, 0% | — | — | — | — | — | 0.5 | — | 0.5 |
| D10 | Silicon-carbon composite, 5% | — | 0.5 | — | — | — | — | — | — |
| D11 | Silicon-carbon composite, 5% | — | — | — | — | — | 0.5 | — | — |
| D12 | Silicon-carbon composite, 5% | — | — | — | — | — | — | — | — |
| S1 | Artificial graphite, 0% | — | 0.1 | — | — | — | 0.5 | — | — |
| S2 | Artificial graphite, 0% | — | 0.5 | — | — | — | 0.5 | — | — |
| S3 | Artificial graphite, 0% | — | 3 | — | — | — | 0.5 | — | — |
| S4 | Artificial graphite, 0% | — | 0.25 | 0.25 | — | — | 0.5 | — | — |
| S5 | Artificial graphite, 0% | — | 0.25 | — | — | — | 0.5 | — | — |
| S6 | Artificial graphite, 0% | — | 1 | — | — | — | 0.5 | — | — |
| S7 | Artificial graphite, 0% | — | 5 | — | — | — | 0.5 | — | — |
| S8 | Artificial graphite, 0% | — | 6 | — | — | — | 0.5 | — | — |
| S9 | Artificial graphite, 0% | — | 1 | — | — | — | 0.5 | — | 0.5 |
| S10 | Artificial graphite, 0% | — | 0.5 | — | — | — | 0.5 | — | 0.5 |

TABLE 1-continued

| Battery number | Negative active substance, SiO$_X$ mass percent | Mass of the additive A with respect to 1 gram of SiO$_X$ (g) | Type and dosage of the additive (wt %) ||||||| 
| | | | Additive A |||| Additive B || Additive |
| | | | Mol. 1 | Mol. 2 | Mol. 3 | Mol. 4 | LiDFOP | LiTFOP | C DTD |
|---|---|---|---|---|---|---|---|---|---|
| S11 | Artificial graphite, 0% | — | 0.5 | — | — | — | 5 | — | 0.5 |
| S12 | Artificial graphite, 0% | — | 0.5 | — | — | — | — | 0.5 | 0.5 |
| S13 | Artificial graphite, 0% | — | — | 0.5 | — | — | 0.5 | — | 0.5 |
| S14 | Artificial graphite, 0% | — | — | — | 0.5 | — | 0.5 | — | 0.5 |
| S15 | Artificial graphite, 0% | — | — | 0.5 | — | — | — | 0.1 | 0.5 |
| S16 | Artificial graphite, 0% | — | — | 0.5 | — | — | — | 0.5 | 0.5 |
| S17 | Artificial graphite, 0% | — | — | 0.5 | — | — | — | 5 | 0.5 |
| S18 | Artificial graphite, 0% | — | — | — | 0.5 | — | — | 0.5 | 0.5 |
| S19 | Artificial graphite, 0% | — | — | — | 0.5 | — | — | 0.1 | 0.5 |
| S20 | Artificial graphite, 0% | — | — | — | 0.5 | — | — | 5 | 0.5 |
| S21 | Artificial graphite, 0% | — | — | — | — | 0.5 | 0.5 | — | 0.5 |
| S22 | Artificial graphite, 0% | — | 0.01 | — | — | — | 0.5 | — | 0.5 |
| S23 | Artificial graphite, 0% | — | — | 0.01 | — | — | 0.5 | — | 0.5 |
| S24 | Artificial graphite, 0% | — | 10 | — | — | — | 0.5 | — | 0.5 |
| S25 | Artificial graphite, 0% | — | — | 10 | — | — | 0.5 | — | 0.5 |
| S26 | Artificial graphite, 0% | — | — | — | 10 | — | 0.5 | — | 0.5 |
| S27 | Artificial graphite, 0% | — | 0.5 | 0.5 | 0.5 | 0.5 | 0.5 | — | 0.5 |
| S28 | Artificial graphite, 0% | — | 1 | 1 | — | — | 2 | — | 0.5 |
| S29 | Artificial graphite, 0% | — | — | — | 2 | 2 | 3 | — | 0.5 |
| S30 | Silicon-carbon composite, 5% | 0.0005 | 0.02 | — | — | — | 0.5 | — | 0.5 |
| S31 | Silicon-carbon composite, 5% | 0.003 | 0.12 | — | — | — | 0.5 | — | 0.5 |

TABLE 1-continued

| Battery number | Negative active substance, SiO$_X$ mass percent | Mass of the additive A with respect to 1 gram of SiO$_X$ (g) | Type and dosage of the additive (wt %) | | | | | | |
|---|---|---|---|---|---|---|---|---|---|
| | | | Additive A | | | | Additive B | | Additive C |
| | | | Mol. 1 | Mol. 2 | Mol. 3 | Mol. 4 | LiDFOP | LiTFOP | DTD |
| S32 | Silicon-carbon composite, 5% | 0.005 | 0.2 | — | — | — | 0.5 | — | 0.5 |
| S33 | Silicon-carbon composite, 5% | 0.01 | 0.4 | — | — | — | 0.5 | — | 0.5 |

Note:
"—" in Table 1 means that no substance is added;
LiDFOP: lithium difluorodioxalate phosphate;
LiTFOP: lithium tetrafluorooxalate phosphate;
DTD: vinyl sulfate;
Mol. 1: 2, -octene-succinic anhydride;
Mol. 2: 1-allyl-2,2'-diphenyl-succinic anhydride;
Mol. 3: 1-allyl-glutaric anhydride;
Mol. 4: 1-allyl-adipic anhydride.

Performance Test:

Performing the Following Tests on Batteries S1-S33 and Batteries D1-D12:

(1) Testing Storage Performance of a Lithium-Ion Battery Under 60° C.

Charging the lithium-ion battery to 4.2 V under a room temperature by using a constant current of 1 C, then charging the battery to a current of 0.05 C with a constant voltage of 4.2 V, testing the volume of the battery V0; then leaving the lithium-ion battery in a 60° C. thermostat, and storing the battery for 20 days; taking out the battery at the n$^{th}$ day, and measuring the volume of the battery, and recording the measured value as Vn; and calculating a volume expansion rate of the lithium-ion battery on the 20$^{th}$ day according to the following formula. Results are shown in Table 3.

The volume expansion rate of the lithium-ion battery stored under a high temperature for n days (%)=(Vn−V0)/V0×100%, where n is the number of days of storing the lithium-ion battery under a high temperature.

(2) Testing a Direct-Current Resistance of the Lithium-Ion Battery Under 25° C.

Charging the battery under 25° C. to a 50% state-of-charge (SOC) by using a 0.5 C constant current/constant voltage (charging the battery to 3.85 V with a 0.5 C constant current, and then charging the battery to 0.05 C with a 3.85 V constant voltage); resting the battery for 10 minutes, and then discharging the battery for 10 seconds with a 0.1 C constant current, and recording the voltage U1 after the discharge; and discharging the battery for 30 seconds with a 4 C constant current, and recording the voltage U2 after the discharge.

Calculating the direct-current resistance of the lithium-ion battery according to the formula: DCR=(U2−U1)/(4 C−0.1 C).

(3) Testing a Capacity Retention Rate of the Lithium-Ion Battery Stored Under 60° C. for 60 Days Charging the battery to 4.2 V with a constant current of 1 C, then charging the battery to a current of 0.05 C with a constant voltage of 4.2 V; resting the battery for 10 minutes, then discharging the battery to a cut-off voltage of 2.8 V with a constant current of 1 C, and recording a pre-storage capacity CAP 1; charging the battery to a cut-off voltage 4.2 V with a constant current of 1 C, then charging the battery to a current of 0.05 C with a constant voltage of 4.2 V; leaving the lithium-ion battery in a 60° C. oven for 60 days, taking it out and discharging it to 2.8 V with a constant current of 1 C, and recording a post-storage capacity CAP 2; calculating a storage capacity retention rate of the lithium-ion secondary battery according to the following formula:

Storage capacity retention rate of the lithium-ion secondary battery (%)=CAP 2/CAP 1×100%.

Table 2 shows test results of electrical performance of the battery obtained from Comparative Embodiments 1-12 and Embodiments 1-33, including the volume expansion rate of samples D1-D12 and S1-S33 tested after being stored under 60° C. for 20 days, direct-current resistance under 25° C., and the capacity retention rate of the samples tested after being stored under 60° C. for 60 days.

TABLE 2

| Battery number | Volume expansion rate after being stored under 60° C. | | | | 25° C. DCR (mhom) 50% SOC at 4 C 30 S | Capacity retention rate after being stored under 60° C. for 60 days |
|---|---|---|---|---|---|---|
| | 5 days | 10 days | 15 days | 20 days | | |
| D1 | 5.3% | 9.6% | 12.5% | 15.8% | 185 | 75% |
| D2 | 5.7% | 9.5% | 12.1% | 15.1% | 191 | 76% |
| D3 | 4.9% | 9.1% | 12.7% | 15.4% | 189 | 75% |
| D4 | 21.6% | 36.6% | 44.6% | 60.8% | 138 | 64% |
| D5 | 19.9% | 34.8% | 42.6% | 58.9% | 109 | 65% |
| D6 | 19.1% | 34.1% | 42.2% | 57.3% | 115 | 66% |
| D7 | 15.8% | 30.8% | 40.6% | 52.1% | 148 | 79% |
| D8 | 5.8% | 9.9% | 12.7% | 15.7% | 207 | 82% |
| D9 | 14.1% | 28.6% | 39.6% | 50.8% | 114 | 74% |
| D10 | 8.9% | 11.1% | 17.2% | 26.9% | 278 | 70% |
| D11 | 17.6% | 33.1% | 39.6% | 52.8% | 228 | 69% |
| D12 | 17.7% | 32.2% | 40.7% | 53.8% | 241 | 68% |
| S1 | 6.3% | 11.9% | 14.7% | 18.1% | 152 | 79% |
| S2 | 5.6% | 9.8% | 12.8% | 15.2% | 161 | 81% |
| S3 | 5.3% | 9.4% | 12.0% | 15.0% | 167 | 80% |
| S4 | 5.4% | 9.0% | 12.8% | 15.3% | 159 | 80% |

TABLE 2-continued

| Battery number | Volume expansion rate after being stored under 60° C. | | | | 25° C. DCR (mhom) 50% SOC at 4 C | Capacity retention rate after being stored under 60° C. for 60 days |
| --- | --- | --- | --- | --- | --- | --- |
| | 5 days | 10 days | 15 days | 20 days | 30 S | |
| S5  | 5.3%  | 9.4%  | 12.0% | 14.8% | 154 | 80% |
| S6  | 5.4%  | 9.0%  | 12.8% | 15.3% | 165 | 81% |
| S7  | 4.0%  | 7.6%  | 11.4% | 13.4% | 172 | 80% |
| S8  | 4.2%  | 7.5%  | 11.3% | 13.2% | 174 | 80% |
| S9  | 4.9%  | 8.9%  | 12.6% | 14.7% | 166 | 83% |
| S10 | 5.7%  | 9.4%  | 13.3% | 15.0% | 163 | 84% |
| S11 | 5.1%  | 8.9%  | 12.7% | 15.1% | 159 | 83% |
| S12 | 5.2%  | 9.1%  | 12.9% | 15.3% | 164 | 83% |
| S13 | 6.1%  | 9.5%  | 13.8% | 15.2% | 163 | 83% |
| S14 | 6.0%  | 9.3%  | 12.2% | 15.7% | 165 | 83% |
| S15 | 5.2%  | 8.9%  | 12.3% | 15.3% | 171 | 84% |
| S16 | 5.3%  | 8.2%  | 12.8% | 15.9% | 166 | 83% |
| S17 | 5.9%  | 8.6%  | 13.0% | 14.7% | 165 | 84% |
| S18 | 5.2%  | 8.9%  | 12.8% | 15.1% | 163 | 83% |
| S19 | 5.4%  | 9.2%  | 12.7% | 15.8% | 173 | 83% |
| S20 | 5.8%  | 12.3% | 15.4% | 15.3% | 159 | 83% |
| S21 | 5.6%  | 12.1% | 14.3% | 15.2% | 166 | 83% |
| S22 | 16.6% | 28.4% | 36.0% | 40.7% | 115 | 80% |
| S23 | 17.1% | 27.7% | 35.9% | 40.2% | 113 | 80% |
| S24 | 5.3%  | 9.6%  | 12.5% | 14.3% | 181 | 85% |
| S25 | 5.2%  | 9.7%  | 12.9% | 14.3% | 183 | 85% |
| S26 | 5.1%  | 9.8%  | 12.8% | 14.5% | 182 | 85% |
| S27 | 6.1%  | 10.1% | 12.9% | 15.7% | 168 | 83% |
| S28 | 6.1%  | 9.5%  | 12.6% | 15.9% | 165 | 84% |
| S29 | 5.4%  | 9.8%  | 11.9% | 15.2% | 160 | 85% |
| S30 | 8.5%  | 12.4% | 19.2% | 26.8% | 238 | 77% |
| S31 | 7.7%  | 11.5% | 18.2% | 25.8% | 240 | 78% |
| S32 | 7.3%  | 11.6% | 18.0% | 25.4% | 246 | 79% |
| S33 | 6.5%  | 11.5% | 17.2% | 24.6% | 250 | 79% |

As can be seen from Table 2, when the electrolytic solution (D1-D3) includes only the additive A, the gas generation problem of the battery is mitigated moderately. However, due to a high resistance of the SEI film components formed by decomposition of the additive A, an initial direct-current resistance of the battery is relatively high, and the battery incurs a problem of abrupt deterioration of high-temperature storage performance. When the electrolytic solution (D5-D7) includes only the additive B or the additive C, the SEI film formed on the surfaces of the positive and negative electrodes is not tough. The SEI film is prone to rupture when the volume of the active substance increases and decreases during an intercalation and deintercalation of lithium ions. Consequently, the electrolytic solution is prone to side reactions on afresh surface of the active substance, and the gas generation problem of the battery is still severe.

The batteries S1-S8 are samples, of which the electrolytic solution contains both the additive A and the additive B. After being stored under a high temperature, all the batteries have a low volume expansion rate and a low direct-current resistance. Evidently, with the additive A used together (including, mixed) with the additive B, a tough SEI film of a high ion conductivity is formed on surfaces of the positive and negative electrodes concurrently, and the interface compatibility between the positive and negative electrodes and the electrolytical solution is improved significantly. This not only significantly mitigates the gas generation problem of the battery cell under a high temperature, but also ensures a relatively low internal resistance of the battery cell and enhances the high-temperature storage performance of the battery cell. In addition, when the content of the additive A reaches 0.5%, as described in Embodiment S2, effects of suppressing the gas generation of the battery cell under 60° C. are significant. When a high content (>6%) of the additive A is added, as against a conventional dosage of 0.5%, the direct-current resistance of the battery cell in this system increases slightly but without reducing the gas generation under a high temperature significantly. Finally, a best range of the relative content ratio of the additive A to the additive B in the electrolytic solution is 0.5-6. When the content ratio of the additive A to the additive B in the electrolytic solution of the lithium-ion battery is in such a range, films can be formed on the surfaces of the positive electrode plate and the negative electrode plate concurrently, and the components and the structure of the SEI films formed on the surface of the negative electrode are further optimized. A highly polymerized, highly ordered, low-resistance tough meshed organic film is formed, thereby significantly improving cycle performance and high-temperature storage performance of the lithium-ion battery, and also ensuring excellent kinetic performance of the lithium-ion battery.

As can be learned from Embodiments S30-S33 and Comparative Embodiments D10-D12, the formula of the electrolytic solution is especially prominent in improving the high-temperature storage performance and the cycle performance of a battery system with a SiOx-containing negative electrode active substance. When the mass of the additive A is 0.0005 g-0.01 g with respect to 1 gram of SiOx material, the additive A can form a low-resistance toughened meshed film on the surface of the SiOx material. This helps to improve the film quality of the silicon-containing negative electrode active substance, avoids a problem of repeated "formation-rupture-re-formation on a fresh surface" of the SEI film on the silicon surface in subsequent charge and discharge cycles, and ensures a high ion conductivity and high cycle performance of the battery.

In conclusion, this application effectively overcomes various disadvantages in the prior art and is of high commercialization value.

The embodiments described above are only an exemplary description of the principles and effects of this application, but are not intended to limit this application. A person skilled in the art can modify or change the above embodiments without departing from the spirit and scope of this application. Therefore, any equivalent modification or change made by a person of ordinary skill in the art without departing from the spirit and technical principles of this application shall fall within the protection scope of the claims of this application.

What is claimed is:

1. An electrolytic solution, comprising an electrolyte and a solvent, an additive A and an additive B, wherein the additive A comprises:

the additive B comprises a compound selected from at least one of compounds whose chemical structural formula is denoted by Formula II-A:

(II-A)

in Formula II-A, A, B, C, and D, are each independently selected from F, Cl, Br or I.

2. The electrolytic solution according to claim 1, wherein the additive A further comprises a compound selected from one or more of compounds whose chemical structural formula is denoted by Formula I-B, Formula I-C, or Formula I-D:

I-B

I-C

I-D wherein, $R_3$ and $R_4$ are each independently selected from: H; F; Cl; Br; I; saturated or unsaturated, substituted or unsubstituted $C_1$-$C_{10}$ aliphatic groups; substituted or unsubstituted $C_3$-$C_9$ cycloalkyls; substituted or unsubstituted $C_1$-$C_{10}$ alkoxies; substituted or unsubstituted $C_6$-$C_{20}$ aryls; or, substituted or unsubstituted $C_3$-$C_{20}$ heteroaryls; and a value of $n_2$ is 0, 1, 2, 3, 4, 5, 6, 7, 8, or 9.

3. The electrolytic solution according to claim 1, wherein the additive B further comprises a compound selected from at least one of compounds denoted by Formula II-B:

II-B wherein, J and K are each independently selected from F, Cl, Br or I.

4. The electrolytic solution according to claim 1, wherein a mass of the additive A is 0.01%-10% of a total mass of the electrolytic solution;

a mass of the additive B is 0.01%-10% of the total mass of the electrolytic solution; and a mass ratio of the additive A to the additive B is 1:0.1 to 1:10.

5. The electrolytic solution according to claim 1, wherein a mass of the additive A is 0.1%-6% of a total mass of the electrolytic solution;

a mass of the additive B is 0.1%-5% of the total mass of the electrolytic solution; and a mass ratio of the additive A to the additive B is 1:0.1 to 1:10.

6. The electrolytic solution according to claim 1, wherein the electrolyte comprises $LiPF_6$.

7. The electrolytic solution according to claim 1, further comprising an additive C, wherein the additive C comprises a cyclic sulfate compound containing an S=O group.

8. The electrolytic solution according to claim 7, wherein a chemical structural formula of the cyclic sulfate compound containing an S=O group is denoted by Formula III:

III wherein, $R_6$ and $R_7$ are each independently selected from: H; F; Cl; Br; I; saturated or unsaturated, substituted or unsubstituted $C_1$-$C_{10}$ aliphatic groups; substituted or unsubstituted $C_3$-$C_9$ cycloalkyls; substituted or unsubstituted $C_1$-$C_{10}$ alkoxies; substituted or unsubstituted $C_6$-$C_{20}$ aryls; or, substituted or unsubstituted $C_3$-$C_{20}$ heteroaryls.

9. The electrolytic solution according to claim 7, wherein a chemical structural formula of the cyclic sulfate compound containing an S=O group is denoted by Formula III:

III wherein, $R_6$ and $R_7$ are each independently selected from H.

10. The electrolytic solution according to claim 7, wherein a mass of the additive C is 0.1%-8% of a total mass of the electrolytic solution.

11. The electrolytic solution according to claim 7, wherein a mass of the additive C is 0.1%-5% of a total mass of the electrolytic solution.

12. The electrolytic solution according to claim 1, wherein the additive A further comprises at least one of compounds denoted by:

13. The electrolytic solution according to claim 6, wherein the electrolyte further comprises one or more of LiBF$_4$, LIN(SO$_2$F)$_2$, LIN(CF$_3$SO$_2$)$_2$, LiClO$_4$, LiAsF$_6$, LiB(C$_2$O$_4$)$_2$, LiBF$_2$(C$_2$O$_4$), LIN(SO$_2$R$_F$)$_2$, or LIN(SO$_2$F)(SO$_2$R$_F$), wherein R$_F$ is C$_{n'}$F$_{2n'+1}$, and n' is 1, 2, 3, 4, 5, 6, 7, 8, 9, or 10.

14. A lithium-ion battery, comprising a positive electrode plate, a negative electrode plate, a separator located between the positive electrode plate and the negative electrode plate, and an electrolytic solution, wherein the electrolytic solution comprises an electrolyte and a solvent, an additive A and an additive B, wherein the additive A comprises:

the additive B comprises a compound selected from at least one of compounds whose chemical structural formula is denoted by Formula II-A:

(II-A)

in Formula II-A, A, B, C, and D are each independently selected from F, Cl, Br or I.

15. The lithium-ion battery according to claim 14, wherein the negative electrode plate comprises artificial graphite.

16. The lithium-ion battery according to claim 14, wherein the negative electrode plate comprises SiOx (x: 0.9-1.8); with respect to 1 gram of the SiOx, a mass of the additive A is 0.0005 g-0.01 g.

17. The lithium-ion battery according to claim 15, wherein a thickness of an active substance layer on a single side of the negative electrode plate is 30 μm-85 μm.

18. The lithium-ion battery according to claim 14, wherein the positive electrode plate comprises a positive electrode active substance, and the positive electrode active substance comprises at least one of compounds denoted by Formula IV:

$$Li_{1+y}Ni_aCo_bMe_{1-a-b}O_{2-z}A_z \qquad \text{IV}$$

in Formula IV, −0.1≤y≤0.2, 0.5<a<0.9, 0<b<0.5, 0.5<a+b<1, 0≤z<0.2, Me comprises one or more of Mn, Fe, Cr, Ti, Zn, V, Al, Zr, or Ce, and A comprises one or more of S, N, F, Cl, Br, or I.

19. An apparatus, comprising the lithium-ion battery according to claim 14.

20. The apparatus according to claim 19, wherein the apparatus comprises an electric vehicle, a hybrid electric vehicle, a plug-in hybrid electric vehicle, an electric bicycle, an electric scooter, an electric golf cart, an electric truck, an electric ship, and an energy storage system.

* * * * *